United States Patent [19]

Johnston et al.

[11] Patent Number: 5,690,396
[45] Date of Patent: Nov. 25, 1997

[54] PROPORTIONAL FLUID PRESSURE REGULATION SYSTEM

[75] Inventors: Gary Lee Johnston, Pleasant Hill, Ohio; James William Zehnder, II, Huber Heights, Ohio; William Charles Kruckemeyer, Beaver Creek, Ohio; Richard Edward Longhouse, Dayton, Ohio; Michael Leslie Oliver, Xenia, Ohio

[73] Assignee: General Motors Corporation, Detroit, Mich.

[21] Appl. No.: 602,524

[22] Filed: Feb. 20, 1996

[51] Int. Cl.⁶ .................................................. B60T 13/74
[52] U.S. Cl. ..................................... 303/3; 303/10; 303/15; 303/113.2
[58] Field of Search .......................... 303/2, 3, 10, 15, 303/20, 116.2, 113.2, 139, 125, 901; 137/901

[56] References Cited

U.S. PATENT DOCUMENTS

| | | | |
|---|---|---|---|
| 4,755,008 | 7/1988 | Imoto et al. | 303/113.2 |
| 4,768,843 | 9/1988 | Baughman et al. | 303/113.2 X |
| 5,156,448 | 10/1992 | Kirstein | 303/113.2 |
| 5,342,119 | 8/1994 | Smith et al. | 303/901 X |

*Primary Examiner*—Lee W. Young
*Attorney, Agent, or Firm*—Jeffrey A. Sedlar

[57] ABSTRACT

A proportional fluid pressure regulation system is provided using a combination of a proportional valve and a shuttle valve for fluid flow control. A system of fluid pressure regulation is achieved where the desired pressure output is provided by one of two pressure input sources. The two pressure input sources are alternately selected by operation of a pilot operated shuttle valve and a solenoid operated proportional valve. The two pressure sources may comprise a manually actuated vehicle braking system's master cylinder and a power operated fluid pump.

11 Claims, 3 Drawing Sheets

PROPORTIONAL FLUID PRESSURE REGULATION SYSTEM

BACKGROUND OF THE INVENTION

The present invention relates to proportional fluid pressure regulation and more particularly, to a proportional fluid pressure regulation system using a combination of a proportional valve and a shuttle isolation valve for fluid flow control.

Proportional fluid pressure regulation is the action of a mechanism to vary fluid output pressure relative to the fluid input pressure in response to one or more varying control factors. The output pressure is generally controlled to effect a desired response from a fluid actuated element. This type of a control mechanism has found particularly useful application in the control of automotive braking systems.

It is typical for an automotive braking system to operate in a traditional base brake mode wherein manual actuation of a master cylinder effects a desired application of the wheel brakes. In addition to the base brake mode, braking systems are often capable of controlling vehicle deceleration through anti-lock operation, controlling vehicle acceleration through traction control operation and improving lateral and longitudinal vehicle stability through stability enhancement systems which provide a level of dynamic handling augmentation. Such multi-functional brake systems are becoming increasingly more common and therefore, providing an effective and economical multi-functional system is desirable.

SUMMARY OF THE INVENTION

The present invention provides a system of fluid pressure regulation useful in applications such as vehicle braking systems. The system includes a shuttle valve that has three ports. A first port of the shuttle valve is connected to a pressure input line originating at the vehicle's master cylinder. A second port of the shuttle valve is connected to a pressure input line that originates at a motor driven pump assembly. A third port of the shuttle valve is connected to a pressure output line that leads to a wheel brake actuator. The shuttle valve includes an alternately positionable element to provide fluid communication between the master cylinder and the wheel brake directly or to provide fluid communication between the pump and the wheel brake.

The pressure output line is normally in communication with the pressure input line leading from the master cylinder to the shuttle valve, hereinafter referred to as the master cylinder pressure input line. Selective operation of the shuttle valve isolates the master cylinder from the output line and places the output line in communication with the input line leading from the pump to the shuttle valve, hereinafter referred to as the pump pressure input line. This can occur either for all powered operation of the wheel brakes or for only functions such as anti-lock braking, traction control and stability enhancement.

The pump pressure input line includes a proportional valve that is automatically controlled to vary the input pressure to the shuttle valve in response to various control factors. The pump pressure input line preferably includes a two-port accumulator. Including an accumulator with two ports provides for integral attenuation of pump pulsation and noise through the accumulator. This is in contrast to conventional systems that typically provide a separate device for noise reduction. The accumulator also improves system response by carrying a charged pressure source that is maintained and available for supplying input pressure to the wheel brakes.

The pressure charge in the accumulator is preferably maintained by a discharge valve positioned in the pump pressure input line downstream of the accumulator. The discharge valve has the capability of providing positive shut-off of a port communicating with the accumulator. The discharge valve ensures that the accumulator charge is maintained and also ensures that the pressure rail side of the pump pressure input line leading to the shuttle valve is fully discharged when the automatically controlled part of the system is in a standby mode.

Switching between a manually actuated default mode and the automatically actuated control modes is provided by the simple shuttle valve which is a pilot operated spring loaded valve that does not require solenoid control. This results in a total system hydraulic circuit for a four wheel brake vehicle that requires only five solenoid operated valves to function. Therefore, the system is capable of providing a plurality of typically required functions in an effective and economical manner.

DETAILED DESCRIPTION OF THE PRESENTLY PREFERRED EMBODIMENT

Figure 1:
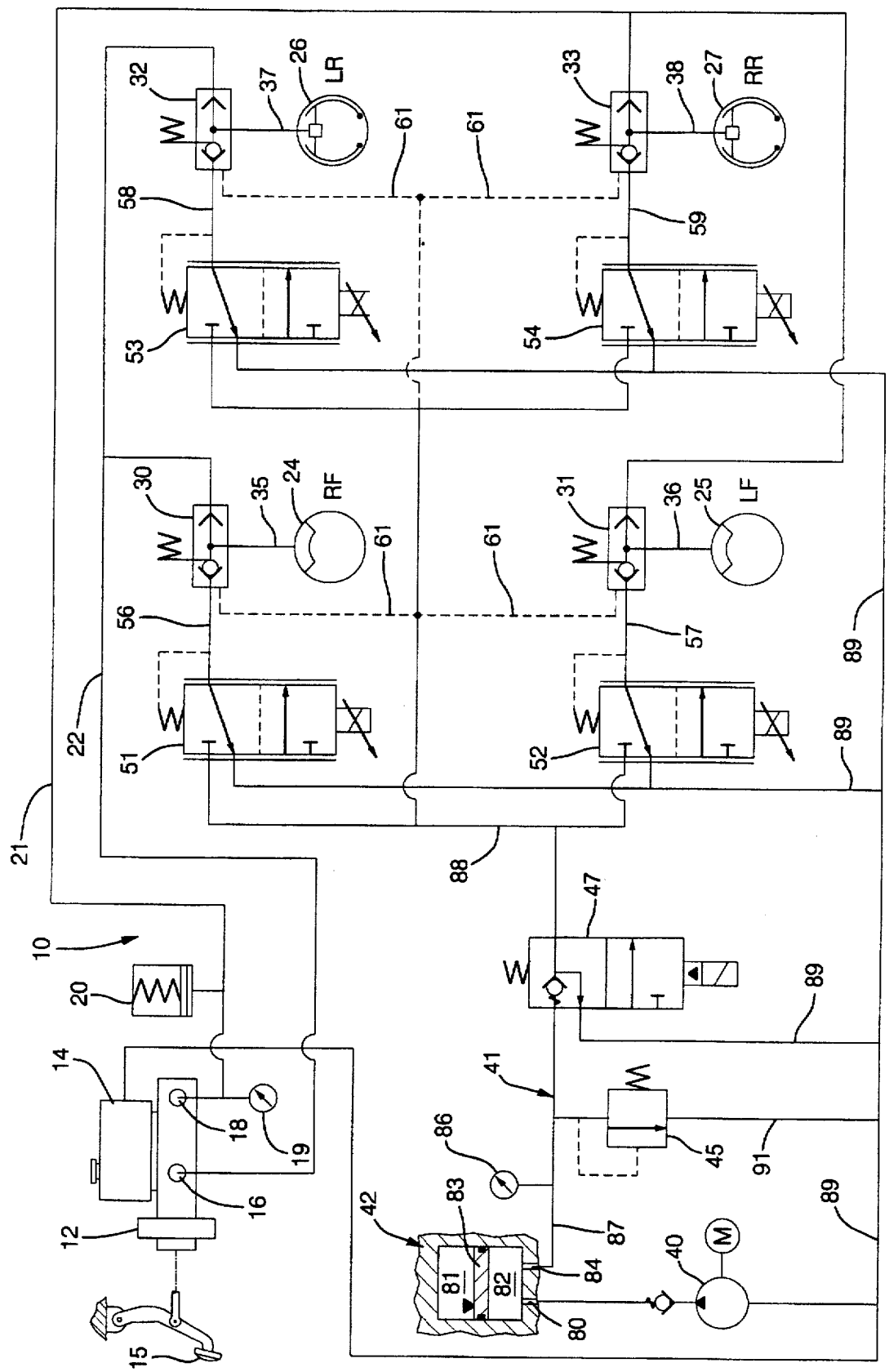
FIG. 1 is a diagrammatic illustration of a proportional fluid pressure regulation system embodied as a vehicle braking system.

Referring to FIG. 1, illustrated is a fluid pressure regulation system embodied as brake system 10. Brake system 10 is capable of conventional manual base brake operation and is also capable of electrically controlled brake operation in response to manual actuation or various sensed vehicle operational parameters for traditional braking, anti-lock braking, traction control operation and for vehicle handling augmentation through a stability enhancement system.

The braking system 10 includes a conventional unboosted master cylinder 12 with an associated fluid reservoir 14. The master cylinder 12 is manually actuated in response to the application of force to the brake pedal 15. The master cylinder 12 includes two output ports 16 and 18. Through the output ports 16 and 18 the master cylinder 12 is capable of actuating two independent braking channels through the master cylinder pressure input lines 21 and 22.

The braking system 10 is arranged in a diagonally split manner so that the master cylinder pressure input line 21 supplies left front wheel brake 25 and right rear wheel brake 27. Similarly, master cylinder pressure input line 22 supplies right front wheel brake 24 and left rear wheel brake 26. Although the system is arranged in a diagonally split manner a plurality of other braking supply arrangements are possible and the present embodiment is intended merely to demonstrate the manner of proportional fluid pressure regulation provided by the present invention.

The master cylinder pressure input lines 21 and 22 do not extend directly to the wheel brakes 24–27 themselves, but rather are routed through shuttle valves 30, 31, 32 and 33. The shuttle valves 30–33 are spring biased to a normal position wherein the master cylinder pressure input line 21 is in communication, through shuttle valve 31 and pressure output line 36, with wheel brake 25, and through shuttle valve 33 and pressure output line 38, with wheel brake 27. Similarly, the master cylinder pressure input line 22 is normally in communication, through shuttle valve 30 and pressure output line 35, with wheel brake 24, and through shuttle valve 32 and pressure output line 37, with wheel brake 26. In this base brake mode, which is the default mode, a normally open connection to the wheel brakes 24–27 through the shuttle valves 30–33 is provided so that manual actuation of the master cylinder 12 through the application of force to brake pedal 15 is certain to provide vehicle braking.

In addition to the capability of manually actuating the braking system 10 through the master cylinder 12, a system of power operation exists which is capable of automatic control. Powered brake actuation is provided through the motor driven pump assembly 40. The input of the pump assembly 40 is connected to the reservoir 14 through line 71 to provide necessary fluid make-up requirements. The outlet of the pump assembly 40 is connected to port 80 of accumulator 42.

Accumulator 42 comprises a gas chamber 81 and a fluid chamber 82 separated by a slidable piston 83. In addition to the port 80, the accumulator includes a second port 84 that serves as an outlet downstream of the port 80 in the pump pressure input line 41. Providing a two-port accumulator 42 results in pump noise attenuation at the accumulator 42. This is accomplished by means of routing all output fluid from the pump assembly 40 into the fluid chamber 82 which permits volumetric expansion by movement of the piston 83 to compress the gas chamber 81. Noise damping occurs in the fluid chamber 82. Therefore, the accumulator 42 provides the dual functions of attenuating pump noise and providing a fluid pressure reservoir for the pressure input line 41.

Fluid pressure in the pump pressure input line 41 is monitored by pressure transducer 86 for use in establishing a desired level of pressure charge in the fluid chamber 82 of accumulator 42. The pressure charge is maintained by a positive shut-off feature of the discharge valve 47 which is positioned in pump pressure input line 41 downstream of accumulator 42. The discharge valve 47 separates the pressure rail side 88 of pump pressure input line 41 from the charged side 87 of pump pressure input line 41. A regulation line 91 extends between the charged side 87 of pump pressure input line 41 and the system return 89 and includes a pressure regulation valve 45. This provides a means of setting the maximum design pressure in the system 10 by relieving excess fluid from the pump pressure input line 41 to the return 89 at a predetermined maximum pressure.

In it normal position, discharge valve 47 ensures that the pressure rail side 88 of pump pressure input line 41 is discharged to return line 89. The discharge valve 47 also operates in its normal position to ensure that the charged side 87 of pump pressure input line 41 is securely sealed off from the pressure rail side 88. The pressure rail side 88 distributes the pump pressure input line 41 to proportional valves 51, 52, 53 and 54 and to pilot lines 61 which extend to shuttle valves 30–33. The pump pressure input line 41 extends through its pressure rail side 88 to the proportional valves 51–54 resulting in control of the fluid pressure reaching the shuttle valves 30–33. Pressure in the modulated pump pressure input line segments 56, 57, 58 and 59 is controlled by operation of the proportional valves 51–54.

Figure 2:
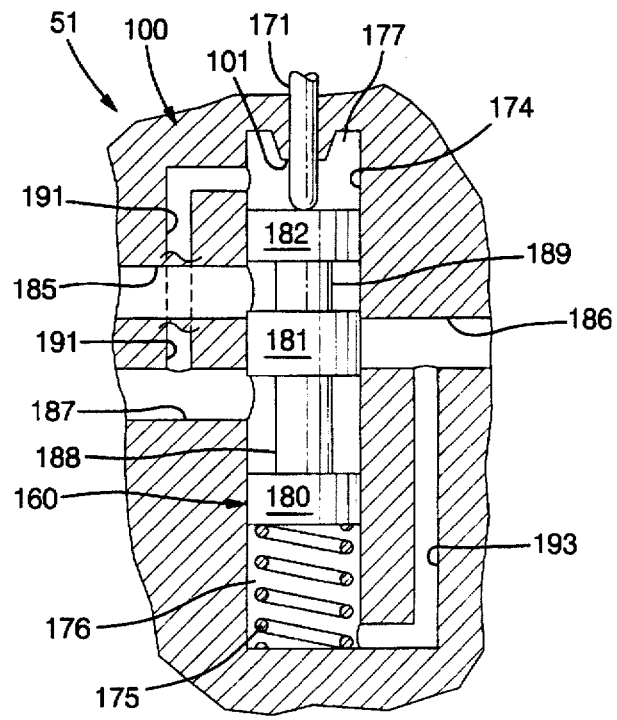
FIG. 2 is a schematic cross-sectional illustration of a proportional valve.

Describing selected components of the braking system 10 in greater detail, reference is directed to FIG. 2 which illustrates an embodiment of the proportional valves 51–54. The proportional valves 51–54 are identical and therefore, the description will be limited to the embodiment illustrated in FIG. 2, which is referenced proportional valve 51. The proportional valve 51 is illustrated schematically in FIG. 2 in a position corresponding to an automatic mode of operation of the braking system 10. More specifically, the valve is positioned in a pressure-hold position. Not illustrated are features such as seals, port connections and the actuator which are conventionally known items or items constructed as conventionally known in the art to provide the necessary functions and operational features of the present invention.

Valve body 100 of proportional valve 51 includes bore 174 in which spool piece 160 is slidably positioned. An actuator rod 171 extends through the valve body 100 and engages the spool piece 160. Positioned around the actuator rod 171 and extending from the valve body 100 into the bore 174 is stop 101. Return spring 175 is positioned in bore 174 on the opposite end of the spool piece 160 from actuator rod 171 and biases the spool piece 160 toward the stop 101. This provides a spring offset feature for the proportional valve 51 which maintains contact between the spool piece 160 and the actuator rod 171 and also normally effects placement of the spool piece 160 at or near the stop 101.

When the associated actuator (not illustrated), is energized to cause actuator rod 171 to move the spool piece 160 to compress spring 175, the actuator works against the force of spring 175 and also against the fluid force supplied to chamber 176 through passage 193. A plurality of passages through the valve body 100 create an interconnecting network of flow paths through the valve body 100 to provide the invention's control scheme between the three ports 185, 186 and 187. Port 186 is connected to the modulated segment 56 of pump pressure input line 41 which extends to the shuttle valve 30. Port 187 is connected to the return system 89 of braking system 10 and port 185 is connected to the pressure rail side 88 of pump pressure input line 41. Passage 191 extends through the valve body 100 between chamber 177 and port 187. Passage 193 extends though the valve body 100 between chamber 176 and port 186.

Spool piece 160 includes valve lands 180, 181 and 182. Undercut 188 is formed between land 180 and land 181 and undercut 189 is formed between land 181 and land 182. By selective actuation of the proportional valve 51 by means of the actuator rod 171 a hold state as illustrated in FIG. 2 can be maintained where port 186 is closed to both ports 185 and 187. This results in maintaining the fluid pressure in modulated segment 56, the pressure output line 35 and the wheel brake 24 at a selected level, momentarily when determined appropriate by the automatic control mechanism. The spool piece 160 is moved by the actuator rod 171 and return spring 175 so that the port 186 is placed in selective communication with either port 185 or port 187 to effect a desired pressure in the modulated segment 56 of pump pressure input line 41.

Valve land 181 provides a significant amount of overlap between opening to the ports 185 or 187 which results in reduced leakage through the valve. The passage 191 ensures that the chamber 177 is relieved to the return system 89 of braking system 10. In operation of the proportional valve 51, when the land 181 is moved in the direction of chamber 176, the undercut 189 permits registry between the ports 185 and 186 so that the pressure rail side 88 of pump pressure input line 41 communicates with the modulated segment 56 opening a path to the shuttle valve 30. When the land 181 is moved toward stop 101, the undercut 188 permits registry between ports 186 and 187 permitting communication between the modulated segment 56 of pump pressure input line 41 and the return system 89. Electrical control of the movement of spool piece 160 provides a means of proportionally increasing or decreasing fluid pressure in the modulated segment 56, in response to various selected control factors.

Figure 3:
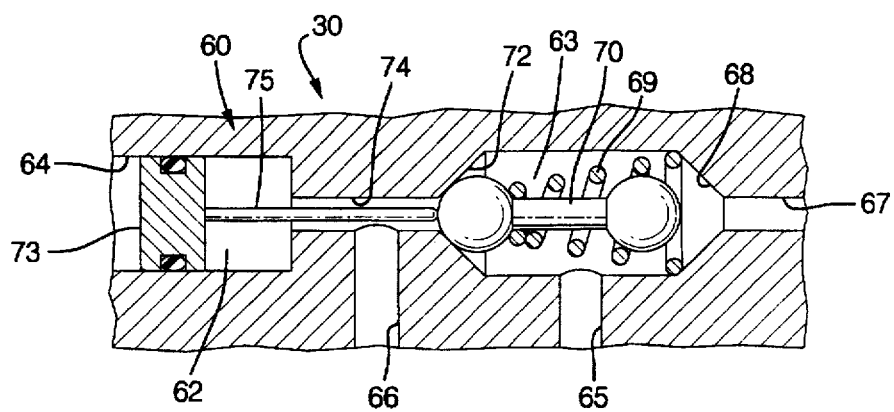
FIG. 3 is a schematic cross-sectional illustration of a shuttle valve shown in its normal position.

Referring to FIG. 3, a schematic representation of the shuttle valves 30–33 is shown as shuttle valve 30. The valve body 60 has two chambers 62 and 63. The chambers 62–63 are connected by passage 74. The valve body 60 includes four ports. The four ports include pilot port 64, which is connected to pilot line 61, outlet port 65, which is connected to pressure output line 35 leading to wheel brake 24, second inlet port 66, which is connected to modulated side 56 of pump pressure input line 41, and first inlet port 67, which is connected to master cylinder pressure input line 22.

Within shuttle valve 30, outlet port 65 communicates with chamber 63 and is continuously open thereto. Inlet port 67 communicates with chamber 63 through valve seat 68 and is normally open to the chamber 63 by means of spring 69 which biases movable shuttle 70 against valve seat 72 which is defined at the chamber 63 end of passage 74, concentrically with the passage 74. Therefore, in the normal position shown in FIG. 3, the inlet port 67 is normally open through the chamber 63 to the outlet port 65.

Figure 4:
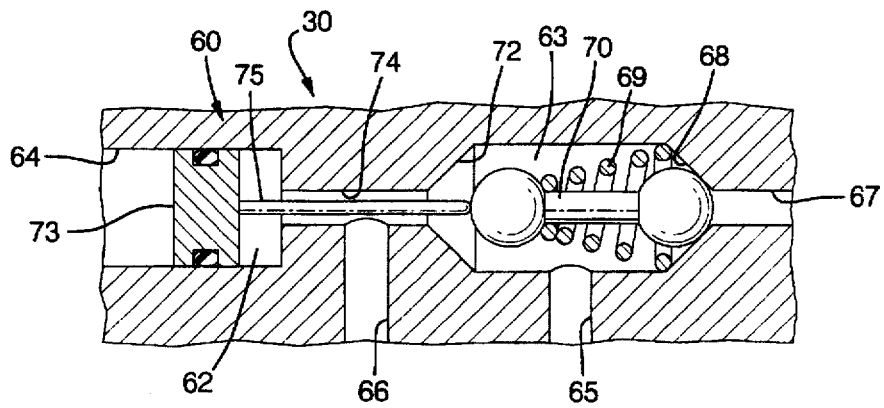
FIG. 4 is a schematic cross-sectional illustration of a shuttle valve shown in its actuated position.

The shuttle valve 30 includes a piston 73 slidably carried in chamber 62 with a connected rod 75 which extends through passage 74 engaging movable shuttle 70. As shown in FIG. 4, in response to pilot pressure presence in pilot port 64, the piston 73 and rod 75 are moved to cause the movable shuttle 70 to compress spring 69 closing the port 67 off from chamber 63 at the valve seat 68. In this actuated position, the outlet port 65 is open to inlet port 66 through the chamber 63 and passage 74 permitting communication between the modulated segment 56 of pump pressure input line 41 and pressure output line 35.

Figure 5:
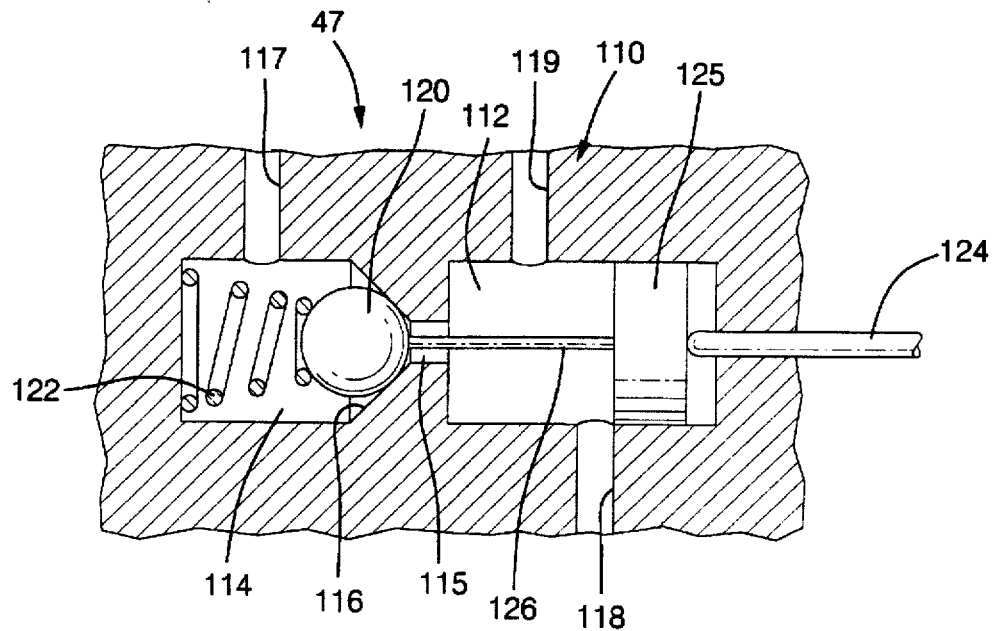
FIG. 5 is a schematic cross-sectional illustration of a discharge valve shown in its normal position.

Referring to FIG. 5, the discharge valve 47 is schematically shown in its normal position. The valve body 110 of discharge valve 47 includes internal chambers 112 and 114 which are connected by opening 115. Opening 115 is surrounded by valve seat 116 on the side of chamber 114. The valve body 110 defines three ports. Charged side port 117 is connected to the charged side 87 of pump pressure input line 41. Charged side port 117 is continuously in open communication with chamber 114 of discharge valve 47. Return system port 118 is in communication with return system 89 of braking system 10 and, in the normal position of discharge valve 47 as illustrated in FIG. 5, is in fluid communication with chamber 112. Pressure rail side port 119 is connected to pressure rail side 88 of pump pressure input line 41 and is continuously in open communication with chamber 112 of discharge valve 47.

The discharge valve 47 includes a movable valve element 120 which is normally biased against valve seat 114 by spring 122 so that when the discharge valve 47 is in its normal position, charged side port 117 is securely closed off from return system port 118 and pressure rail side port 119. Discharge valve 47 also includes a spool piece 125 which is slidably carried in chamber 112 and is attached to a push-rod 126 that extends through opening 115 and engages the movable valve element 120. In the normal position as shown in FIG. 5, spool piece 125 is positioned so that ports 118 and 119 are in fluid communication with each other through the chamber 112.

A rod 124 extends through the valve body 110 and into chamber 112 engaging spool piece 125. A solenoid actuator (not illustrated) associates with the discharge valve 47 and is capable of selectively repositioning the rod 124, when required by the control scheme of braking system 10, to the actuated position of FIG. 6. When the associating solenoid actuator is energized, the rod 124 pushes the spool piece 125 toward the right which in turn causes push rod 126 to reposition movable valve element 120 compressing spring 122. This results in closing off communication between return system port 118 and pressure rail side port 119 by obstructing the return system port 118 with spool piece 125 and opening the charged side port 117 to pressure rail side port 119 through chamber 114, valve seat 116, opening 115 and chamber 112. Spool piece 125 includes a significant positive overlap of the return system port 118 to securely close off communication with the chamber 112.

When the discharge valve 47 is in its normal position illustrated in FIG. 5, the pressure rail side 88 of pump pressure input line 41 communicates with return system 89 through return system port 118, chamber 112 and pressure rail side port 119 of discharge valve 47. The movable valve element 120 securely closes off charged side 87 of pump pressure input line 41. In the actuated position of FIG. 6, discharge valve 47 provides fluid communication between charged side 87 and pressure rail side 88 of pump pressure input line 41 through charged side port 117, chamber 114, valve seat 116, passage 115, chamber 112 and pressure rail side port 119.

Returning to FIG. 1, the operation of the braking system 10 will be described with additional reference to the detailed FIGS. 2–6.

Figure 6:
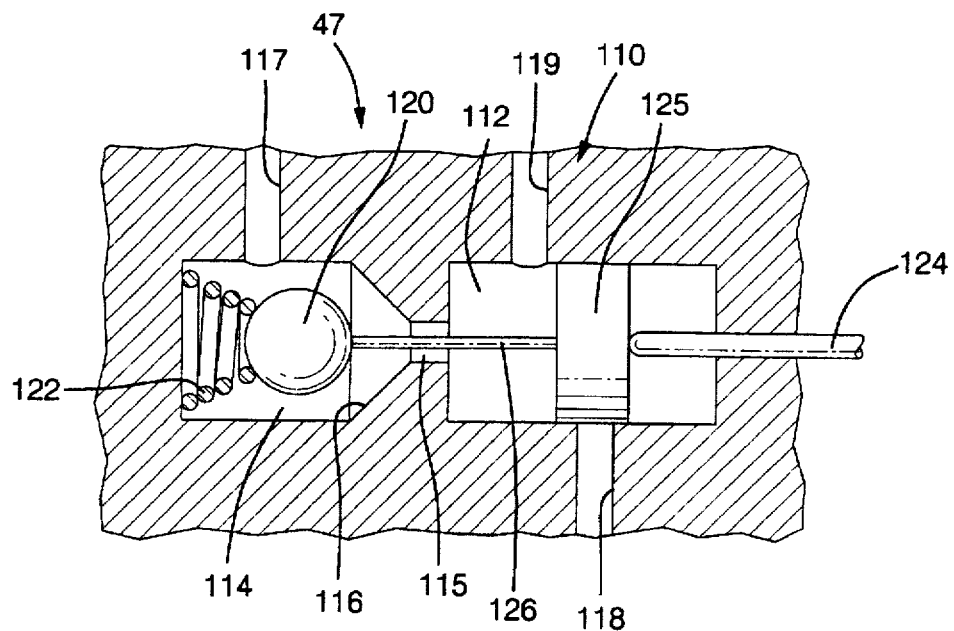
FIG. 6 is a schematic cross-sectional illustration of a discharge valve shown in its actuated position.

In normal power braking operation of the braking system 10, the manual actuation of master cylinder 12 by pedal 15 results in pressurization of the master cylinder pressure input lines 21 and 22 through output ports 16 and 18 which is sensed by pressure transducer 19. In response, the motor 40 is powered into operation and the discharge valve 47 is energized and shifted to its actuated position as shown in FIG. 6. This closes off the return system port 118 of discharge valve 47 from the return system 89 and pressurizes the pressure rail side 88 of the pump pressure input line 41 which supplies line pressure to pilot lines 61 shifting shuttle valves 30–33 to an actuated position as shown in FIG. 4. This isolates the master cylinder pressure input lines 21 and 22 from the wheel brakes 24–27 by closing the inlet port 67 from the outlet port 65.

To provide a measure of normal brake pedal actuation feel to the pedal 15 a variable volumetric device in the form of pedal feel emulator 20 which is embodied as a spring backed piston accumulator is provided in communication with master cylinder pressure input line 21. When the master cylinder pressure input lines 21 and 22 are isolated from the remainder of the braking system 10 the pedal feel emulator 20 provides a receptacle to compensate for fluid volume displaced by actuation of the master cylinder 12 which results in movement of the pedal 15 in proportion to the force applied thereto.

Providing fluid pressure to actuate the wheel brakes 24–27 is achieved by actuating the proportional valves 51–54 which are actuated in proportion to the pressure sensed by pressure transducer 19 to effect the desired pressure in modulated segments 56–59 of pump pressure input line 41 and, through the shuttle valves 30–33 to the wheel brakes 24–27. Open communication is provided between inlet port 66 and outlet port 65 of the shuttle valves 30–33 since they have been shifted, by the pilot pressure supplied through pilot lines 61, to the actuated position of FIG. 4.

The accumulator 42, which is provided to cooperate with the pump 40 in maintaining a consistent minimum pressure in charged side 87 of pump pressure input line 41, ensures that upon the immediate actuation of discharge valve 47, pressure exists to charge the pressure rail side 88 and is available for braking needs to the wheel brakes 24–27 without waiting for pressure to build in response to the operation of pump 40. The securely closing discharge valve 47 ensures that the pressure maintained on charged side 87 is not lost during braking inactivity.

In addition to normal power braking operation, the braking system 10 is capable of providing anti-lock braking, traction control and vehicle handling augmentation through stability enhancement control. For anti-lock braking functions during normal braking applies, the proportional valves 51–54 are independently shiftable to control deceleration of the vehicle. Positioning is possible wherein the port 187, which is connected to the return system 89, is open to the port 186, which is connected to the modulated pump pressure input lines 56–59 so that pressure is released from the wheel brakes 24–27. This is effected while the shuttle valves 30–33 maintain an open flow path between the ports 65 and 66 providing a fluid release route, since the pilot pressure is maintained in pilot port 64 through the pilot line 61. A hold position is also possible wherein the pressure at the wheel brakes 24–27 is maintained. Pressure re-application is possible by opening port 185 to port 186 in any of the proportional valves 51–54.

For traction control operation, automatic response to various vehicular sensors (not illustrated) independent of actuation of the brake pedal 15 the pump 40 is provided to pressurize the braking system 10 through the discharge valve 47 which is shifted to its actuated position charging the pressure rail side 88 of pump pressure input line 41 so that braking pressure is available at the proportional valves 51–54 each of which is independently actuated to effect braking pressure at any selected wheel brake 24–27 through its associated shuttle valve 30–33 which is shifted to its actuated position by pressurization of the pilot line 61. Essentially the same actuation of the wheel brakes 24–27 is effected in response to various sensor inputs to enhance vehicle stability and maneuverability. The traction control and stability enhancement control operation is enhanced by the rapid response time of the system wherein the charged side 87 of the pump pressure input line 41 remains available to effect braking response at any of the wheel brakes 24–27 without waiting for pressure build to occur as a result of operation of pump 40.

The proportional valves 51–54 in operation provide braking pressure to the wheel brakes 24–27 in response to an electronic control unit (not illustrated) which receives various sensor input data including that from the pressure transducer 19. Pilot operation of the shuttle valves 30–33, helps provide an effective and low cost method of isolating the master cylinder 12 from the wheel brakes 24–27, during power brake operation in a relatively simple manner. The positive shut-off feature provided by the discharge valve 47 ensures that the braking system 10 is capable of responding quickly to any brake actuation requirements.

The braking system 10 provides a means of default operation such as in the event of electrical power failure where the manual application of force to brake pedal 15 results in actuation of the wheel brakes 24–27. Should default operation be necessary, the manual actuation of unboosted master cylinder 12 provides fluid pressure output through the output ports 16 and 18 which is communicated through the master cylinder pressure input lines 21 and 22 to the shuttle valves 30–33.

In the event of default operation the spring return feature of shuttle valves 30–33 ensures that the valves are shifted to the normal position wherein the master cylinder pressure input lines 21 and 22 openly communicate with the pressure output lines 35–38 so that fluid pressure is freely transmitted from the master cylinder 12 to the wheel brakes 24–27. During such default operation the discharge valve 47 will be returned to its normal position ensuring that the pressure rail side 88 of pump pressure input line 41 is discharged to the return system 89. This means that the pilot pressure in pilot lines 61 is discharged to the return system 89 making certain that the return springs of shuttle valves 30–33 operate to return the valves to their normal positions unhindered by the presence of pilot pressure.

In a partial or "managed" default mode, should pressure output from pump 40 stop while the rest of the braking system 10 remains operable, the discharge valve 47 is shiftable in response to manual application of force to pedal 15. Actuation of pedal 15 results in pressure transducer 19 signaling the control system that braking is required, and when pressure transducer 86 signals that available braking pressure exists in accumulator 42 to supply fluid pressure to the wheel brakes 24–27 through the pump pressure input line 41, discharge valve 47 is actuated to supply fluid pressure from the charged side 87 to the pressure rail side 88 for brake operation through the proportional valves 56–59. The accumulator 42 is sized so that in such a situation, two complete braking stops of the associated vehicle are possible under power assist from the pressure charge existing in the charge side 87 of pump pressure input line 41.

What is claimed is:

1. A fluid pressure regulation system comprising:

a first pressure input line;

a second pressure input line;

a pressure output line alternately communicating with one of the first pressure input line and the second pressure input line;

a shuttle valve having a first inlet port communicating with the first pressure input line, a second inlet port communicating with the second pressure input line and an outlet port communicating with the pressure output line;

a proportional valve disposed in the second pressure input line having a modulated side port connected to the shuttle valve by a modulated segment of the second pressure input line, the proportional valve operable to effect a modulated fluid pressure level in the modulated segment of the second pressure input line between the proportional valve and the shuttle valve by increasing or decreasing the modulated fluid pressure level proportionally, in response to selected control factors;

wherein the pressure output line is normally in communication with the first pressure input line through the shuttle valve and is simultaneously selectively isolated from the first pressure input line by the shuttle valve and placed in communication with the second pressure input line by the shuttle valve;

a wheel brake wherein the wheel brake is directly connected through the pressure output line to the outlet port of the shuttle valve;

a brake master cylinder disposed in the first pressure input line operable to pressurize the first pressure input line with a manually actuated pressure and further comprising a pressure transducer disposed in the first pressure input line wherein the brake master cylinder is normally in open fluid communication with the pressure output line through the shuttle valve;

wherein the shuttle valve includes a moving shuttle and a spring biasing the moving shuttle to a normal position so that the master cylinder is normally in open fluid communication with the pressure output line through the shuttle valve and wherein the shuttle valve includes a pilot chamber in continuous open fluid communication with the second pressure input line, wherein when the pressure charge effected by the pump is communicated through the second pressure input line to the pilot chamber the moving shuttle of the shuttle valve is moved compressing the spring and closing off fluid communication between the brake master cylinder and the pressure output line through the shuttle valve and simultaneously, open fluid communication is effected between the second pressure input line and the pressure output line through the shuttle valve so that the pressure charge effected by the pump is transmitted to the pressure output line and therethrough to the wheel brake;

and including a discharge valve disposed in the second pressure input line between the accumulator and the proportional valve delimiting the charged side of the second pressure input line to that portion between the pump and the discharge valve and separating a pressure rail side of the second pressure input line from the charged side of the second pressure input line the pressure rail side providing continuously open fluid communication between the discharge valve and the proportional valve and between the discharge valve and the pilot chamber of the shuttle valve, the discharge valve having a charged side port connected to the charged side of the second pressure input line, a pressure rail side port connected to the pressure rail side of the second pressure input line and a return system port, the discharge valve normally separating the charged side of the second pressure input line from the pressure rail side of the second pressure input line and normally providing open fluid communication between the pressure rail side of the second pressure input line and the return system port wherein the pressure rail side is discharged therethrough so that the pilot chamber of the shuttle valve is normally discharged ensuring that the brake master cylinder is normally in open fluid communication with the pressure output line through the shuttle valve.

2. A fluid pressure regulation system according to claim 1 wherein the discharge valve includes a movable valve element that normally closes off the charged side port from both the return system port and the pressure rail side port securely maintaining the pressure charge effected by the pump in the charged side of the second pressure input line and wherein the discharge valve includes a spool piece, the movable valve element and the spool piece being selectively movable in concert in response to a signal generated by the pressure transducer when the brake master cylinder is actuated so that the spool piece closes off the return system port from both the pressure rail side port and the charged side port and the movable valve element simultaneously moves to open the charged side port to the pressure rail side port so that the pressure charge effected by the pump is transmitted to the pressure rail side of the second pressure input line through the discharge valve resulting in movement of the moving shuttle of the shuttle valve to close off fluid communication between the first pressure input line and the pressure output line through the shuttle valve and simultaneously to open fluid communication between the second pressure input line and the pressure output line through the shuttle valve.

3. A fluid pressure regulation system according to claim 2 wherein the wheel brake is actuated in response to one of both the pressure charge effected by the pump and the manually actuated pressure effected by the brake master cylinder.

4. A fluid pressure regulation system for controlling the actuation of a wheel brake in response to a pump effected pressure charge and a master cylinder effected manually actuated pressure comprising:

a shuttle valve having a first inlet port, a second inlet port, an outlet port and a pilot chamber;

a pressure output line extending directly and uninterruptedly between the outlet port of the shuttle valve and the wheel brake;

a master cylinder;

a first pressure input line originating at the master cylinder and extending to the first inlet port of the shuttle valve;

a pump;

a second pressure input line originating at the pump and extending to the second inlet port of the shuttle valve;

a pilot line branching from the second pressure input line and extending to the pilot chamber of the shuttle valve;

a movable shuttle carried in the shuttle valve normally closing the second inlet port off from the outlet port while the first inlet port is concurrently normally open to the outlet port through the shuttle valve so that the manually actuated pressure effected by the master cylinder is transmitted to the wheel brake through the shuttle valve;

wherein the pump effected pressure charge is selectively communicable to the pilot chamber of the shuttle valve to shift the moving shuttle of the shuttle valve which closes off the first inlet port from the outlet port and simultaneously opens the second inlet port to the outlet port so that the pressure charge effected by the pump is communicated to the wheel brake through the shuttle valve;

wherein the shuttle valve includes a piston moveable in response to communication of the pressure charge to the pilot chamber wherein a pushrod extends from the piston and is engageable with the movable shuttle wherein the shuttle valve defines a first chamber that contains the movable shuttle, a second chamber that contains the piston and a passage extending between the first chamber and the second chamber wherein the pushrod extends through the passage and wherein a valve seat is defined concentrically around the passage in the first chamber, the valve seat being closable by the movable shuttle wherein a spring is contained in the first chamber that biases the movable shuttle toward the valve seat;

and including a discharge valve positioned in the second pressure input line between the accumulator and the shuttle valve wherein the discharge valve separates a pressure rail side of the second pressure input line from a charged side of the second pressure input line the charged side defined between the pump and the discharge valve, the discharge valve having a charged side port connected to the charged side of the second pressure input line, a pressure rail side port connected to the pressure rail side of the second pressure input line and a return system port, the discharge valve normally separating the charged side of the second pressure input line from the pressure rail side of the second pressure input line and normally providing open fluid communication between the pressure rail side of the second pressure input line and the return system port wherein the pressure rail side is discharged therethrough wherein the pilot chamber of the shuttle valve is connected to the pressure rail side by a pilot line so that the pilot chamber is normally discharged ensuring that the brake master cylinder is normally in open fluid communication with the pressure output line through the shuttle valve.

5. A fluid pressure regulation system according to claim 4 wherein the discharge valve includes a movable valve element that normally closes off the charged side port from both the return system port and the pressure rail side port securely maintaining the pressure charge effected by the pump in the charged side of the second pressure input line and wherein the discharge valve includes a spool piece, the movable element and the spool piece being selectively movable in concert in response to actuation of the master cylinder so that the spool piece closes off the return system port from both the pressure rail side port and the charged side port and the movable valve element moves to open the charged side port to the pressure rail side port so that the pressure charge effected by the pump is transmitted to the pressure rail side of the second pressure input line resulting in movement of the moving shuttle of the shuttle valve to close off fluid communication between the first pressure input line and the pressure output line through the shuttle valve and simultaneously to open fluid communication between the second pressure input line and the pressure output line through the shuttle valve.

6. A fluid pressure regulation system according to claim 5 further comprising a proportional valve positioned in the second pressure input line between the discharge valve and the shuttle valve, the proportional valve including a valve body defining a bore in which a spool is slidably positioned, the spool normally closing the pressure rail side of the second pressure input line off from a modulated segment of the second pressure input line, the modulated segment defined between the proportional valve and the shuttle valve, wherein an actuator rod extends through the valve body and engages the spool, with a return spring positioned in the bore biasing the spool toward the actuator rod, wherein the actuator rod is selectively movable to move the spool, compressing the spring and opening the pressure rail side of the second pressure input line to the shuttle valve through the modulated segment of the second pressure input line.

7. A fluid pressure regulation system comprising:

a shuttle valve including a valve body that defines a first chamber and a second chamber, the first and second chambers connected by a passage defined by the valve body, the valve body including a pilot port opening to the second chamber, an outlet port opening to the first chamber, a first inlet port opening to the first chamber and a second inlet port opening to the passage, the shuttle valve also including a moving shuttle carried in the first chamber that normally closes off the second inlet port from the outlet port while the first inlet port is normally open to the outlet port;

a brake master cylinder connected to the first inlet port by a first pressure input line;

a pump connected to the second inlet port by a second pressure input line;

a proportional valve positioned in the second pressure input line operable to modulate fluid pressure in the second pressure input line; and a discharge valve positioned in the second pressure input line between the pump and the proportional valve wherein the discharge valve normally isolates the pump from the proportional valve maintaining a pressure charge in the second pressure input line between the pump and the discharge valve.

8. A fluid pressure regulation system according to claim 7 wherein the shuttle valve includes a piston slidably carried in the second chamber with a rod connected to the piston and extending through the passage the rod engaging the movable shuttle, wherein, in response to a pilot pressure presence in the pilot port, the piston and rod move to cause the movable shuttle to close the first inlet port off from the outlet port and to simultaneously open the second inlet port to the outlet port.

9. A fluid pressure regulation system according to claim 7 further comprising a pilot pressure line extending from the second pressure input line, at a point of the second pressure input line between the discharge valve and the proportional valve, to the pilot port wherein when the discharge valve is moved to open the second pressure input line allowing a transmission of the pressure charge to the proportional valve, the pressure charge is also transmitted to the pilot port, and in response, the moving shuttle of the shuttle valve is moved closing the first inlet port off from the outlet port and simultaneously opening the second inlet port to the outlet port so that the pressure charge is transmitted, through the proportional valve, to the outlet port.

10. A fluid pressure regulation system according to claim 9 further comprising a wheel brake connected to the outlet port by an output line wherein the wheel brake is actuated in response to the master cylinder when the first inlet port is open to the outlet port and wherein the wheel brake is actuated by the pump pressure charge when the second inlet port is open to the outlet port.

11. A fluid pressure regulation system according to claim 10 further comprising an accumulator positioned in the second pressure input line between the pump and the discharge valve providing a fluid chamber for maintaining the pressure charge so that upon actuation of the discharge valve the pressure charge is immediately available for movement of the moving shuttle of the shuttle valve and for actuation of the wheel brake through both the proportion valve and the shuttle valve.

* * * * *